US011863806B2

(12) United States Patent
Gupta et al.

(10) Patent No.: US 11,863,806 B2
(45) Date of Patent: *Jan. 2, 2024

(54) SYSTEMS AND METHODS FOR CORRECTING ERRORS IN CAPTION TEXT

(71) Applicant: Rovi Guides, Inc., San Jose, CA (US)

(72) Inventors: Ajay Kumar Gupta, Andover, MA (US); Abhijit Satchidanand Savarkar, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 17/063,373

(22) Filed: Oct. 5, 2020

(65) Prior Publication Data

US 2021/0037274 A1 Feb. 4, 2021

Related U.S. Application Data

(63) Continuation of application No. 16/067,036, filed as application No. PCT/US2016/054689 on Sep. 30, 2016, now Pat. No. 10,834,439.

(51) Int. Cl.
*H04N 21/234* (2011.01)
*H04N 21/488* (2011.01)
(Continued)

(52) U.S. Cl.
CPC ..... *H04N 21/23424* (2013.01); *G06F 40/166* (2020.01); *G06F 40/232* (2020.01);
(Continued)

(58) Field of Classification Search
USPC .................................................. 704/7–10, 257
See application file for complete search history.

(56) References Cited

U.S. PATENT DOCUMENTS 5,617,119 A 4/1997 Briggs et al.
6,239,794 B1 5/2001 Yuen et al.
(Continued)

FOREIGN PATENT DOCUMENTS

CN 105654946 A 6/2016
EP 1848192 10/2007
(Continued)

OTHER PUBLICATIONS

"Systems and Methods for Correcting Errors in Caption Text", PCT International Search Report for International Application No. PCT/US2016/054689, dated Feb. 8, 2017 (14 Pages), dated Feb. 8, 2017, 1-14.

*Primary Examiner* — Leonard Saint-Cyr
(74) *Attorney, Agent, or Firm* — Haley Guiliano LLP

(57) ABSTRACT

Systems and methods are described to address shortcomings in conventional systems by correcting an erroneous term in on-screen caption text for a media asset. In some aspects, the systems and methods identify the erroneous term in a text segment of the on-screen caption text, and identify one or more video frames of the media asset corresponding to the text segment. The systems and methods further identify a contextual term related to the erroneous term from the one or more video frames. By accessing a knowledge graph, the systems and methods identify a candidate correction based on the contextual term and a portion of the text segment. Lastly, the systems and methods replaces the erroneous term with the candidate correction.

18 Claims, 8 Drawing Sheets

(51) Int. Cl.
*H04N 21/2343* (2011.01)
*G06F 40/40* (2020.01)
*G06F 40/166* (2020.01)
*G06F 40/232* (2020.01)

(52) U.S. Cl.
CPC ..... *G06F 40/40* (2020.01); *H04N 21/234336* (2013.01); *H04N 21/4884* (2013.01)

(56) References Cited

U.S. PATENT DOCUMENTS

| | | | |
|---|---|---|---|
| 6,473,778 | B1 | 10/2002 | Gibbon |
| 6,564,378 | B1 | 5/2003 | Satterfield et al. |
| 7,165,098 | B1 | 1/2007 | Boyer et al. |
| 7,296,218 | B2 * | 11/2007 | Dittrich ............... G06F 16/4393 715/201 |
| 7,761,892 | B2 | 7/2010 | Ellis et al. |
| 8,046,801 | B2 | 10/2011 | Ellis et al. |
| 2002/0174430 | A1 | 11/2002 | Ellis et al. |
| 2005/0251827 | A1 | 11/2005 | Ellis et al. |
| 2007/0118357 | A1 | 5/2007 | Kasravi et al. |
| 2007/0118364 | A1 | 5/2007 | Wise et al. |
| 2007/0118372 | A1 | 5/2007 | Wise et al. |
| 2007/0118374 | A1 | 5/2007 | Wise et al. |
| 2009/0185074 | A1 | 7/2009 | Streijl |
| 2010/0121936 | A1 * | 5/2010 | Liu ..................... H04L 65/60 709/217 |
| 2010/0153885 | A1 | 6/2010 | Yates |
| 2011/0134321 | A1 | 6/2011 | Berry et al. |
| 2011/0321100 | A1 * | 12/2011 | Tofighbakhsh .... H04N 21/2668 714/752 |
| 2013/0019267 | A1 | 1/2013 | Tofighbakhsh |
| 2015/0046148 | A1 | 2/2015 | Oh et al. |
| 2015/0142704 | A1 | 5/2015 | London |
| 2016/0035392 | A1 | 2/2016 | Taylor et al. |
| 2016/0092447 | A1 | 3/2016 | Venkataraman et al. |
| 2019/0215545 | A1 | 7/2019 | Gupta et al. |

FOREIGN PATENT DOCUMENTS

| | | |
|---|---|---|
| JP | 2007256714 A | 10/2007 |
| JP | 2016110087 A | 6/2016 |
| WO | WO2015113578 | 8/2015 |

* cited by examiner

SYSTEMS AND METHODS FOR CORRECTING ERRORS IN CAPTION TEXT

CROSS-REFERENCE TO RELATED APPLICATIONS

This application is a continuation of U.S. patent application Ser. No. 16/067,036 filed Jun. 28, 2018, which is a national stage application under 35 U.S.C. § 371 of International Application PCT/US2016/054689, filed Sep. 30, 2016 both of which are hereby incorporated by reference herein in their entirety.

BACKGROUND

Conventional media systems can convert speech information from a news program into on-screen caption text in the form of subtitles or closed captions. Traditionally, this process is handled by a human stenographer. More recently, media systems have begun using speech recognition techniques to parse the speech information and display it as on-screen caption text at substantially the same time as the speech itself. However, these media systems are limited by their dictionary size or by the knowledge of the human stenographer, and often fail to recognize certain terms of art, newly created buzzwords, foreign names, or other words and phrases. The media systems using automatic speech recognition (ASR) are also at a disadvantage when processing homophones (words that sound alike). It is not uncommon to see on-screen caption text for news and sports programs laden with errors. In some conventional systems, these errors must be manually corrected by an experienced human stenographer. However, even human stenographers may not know the correct words or spellings for everything at the moment of typing, and may be susceptible to making typographical errors.

SUMMARY

Systems and methods are described to address shortcomings in conventional media systems by automatically correcting errors in on-screen caption text of a media asset's audio transcription. In some embodiments, a media guidance application corrects the errors by accessing a knowledge graph based on information derived from the media asset itself and looks for candidate replacements or corrections for the errors from within the knowledge graph. In some embodiments, the information derived from the media asset that is used to access the knowledge graph may be text or images that appear in one or more video frames of the media asset surrounding the errors, and can be identified by performing textual or image recognition on the video frames, such as by using an optical character recognition (OCR) algorithm. The information used to access the knowledge graph may also be derived from the correctly recognized portions of the on-screen caption text itself, such as keywords in a partially recognized sentence in the on-screen caption text. In some embodiments, the media guidance application may determine one or more potential corrections for the errors by accessing the knowledge graph and weigh these potential corrections based on their phonetic similarity to the errors in order to select a candidate correction having the highest weight. In some embodiments, the media guidance application may also weigh them based on their respective time stamps, which indicate how up to date the potential corrections are. The media guidance application may then replace the errors with the candidate correction and present an error-free on-screen caption text to viewers.

For example, a media guidance application may make a mistake in transcribing the name for the Chinese president, Xi Jinping, for an on-screen caption text appearing on a news broadcast in the following sentence: "The meeting between President Obama and President Xi Jinping underscored . . . " An ASR system of the media guidance application may fail to recognize the name "Xi Jinping" and instead transcribe the above sentence as "The meeting between President Obama and President She—Jumping underscored . . . " As a first step, the media guidance application may apply one or more natural language processing (NLP) rules to the transcribed sentence and determine that "She—Jumping" is an erroneous term because it fails to adhere to one or more grammar rules. To correct the erroneous term, the media guidance application may extract keywords from the correctly recognized portions of the on-screen caption text, such as "President," and access a knowledge graph based on the term. The media guidance application may also perform OCR on the video frames surrounding the erroneous term, and recognize contextual terms such as "China" and "State Visit" from the video frames. The media guidance application may access the knowledge graph based on these contextual terms in addition to the extracted keywords from the on-screen caption text. By analyzing nodes and properties associated with these terms in the knowledge graph, the media guidance application may identify a number of potential corrections related to "President," "China," and "State Visit," such as "Xi Jinping" and "Hu Jintao." The media guidance application may then replace "She—Jumping" in the original transcribed sentence with "Xi Jinping," in part because the two are phonetically similar. These and other aspects of the present disclosure are discussed in greater details below, especially in relation to FIGS. 1-4.

In some aspects, the systems and methods described provide for correcting an erroneous term in on-screen caption text for a media asset. A media guidance application may analyze an audio stream of the media asset to determine a first text segment of the on-screen caption text. For example, the media guidance application may analyze the audio stream of a sports news commentary and automatically transcribe it into an on-screen caption text. The media guidance application may determine a first text segment of the on-screen caption text to be "It will be interesting to see how Tom Brady performs despite being in the news for div plate date." In some embodiments, the media guidance application may identify an erroneous term in the first text segment of the on-screen caption text. For example, the media guidance application may identify that "div plate date" is an erroneous term in the first text segment. In some embodiments, the media guidance application may identify the erroneous term by performing natural language processing on the first text segment to compare the first text segment against a plurality of grammar rules. For example, the media guidance application may compare the sentence above against a grammar rule that requires the word "div" be followed by a number (e.g., as in "NCAA div one") and determine that "div plate date" is an erroneous term because it conflicts with the grammar rule.

In some embodiments, the media guidance application may extract one or more video frames from a video stream of the media asset corresponding to the first text segment. For example, the media guidance application may extract a video frame from the media asset corresponding to the time that the sentence above appeared in the audio stream. The video stream may be a news interview of Tom Brady, which includes a few video frames displaying the following sentence in a banner overlaying the interview: "News of the Hour: Patriots quarterback serves NFL suspension." The media guidance application may extract these video frames because they correspond to substantially the same time as the sentence "It will be interesting to see how Tom Brady performs despite being in the news for div plate date" is announced on the news.

In some embodiments, the media guidance application may analyze a first video frame of the one or more video frames to determine a contextual term associated with the erroneous term. For example, the media guidance application may analyze the video frame with the banner overlay and determine that the contextual terms "Patriots" and "NFL suspension" from the banner are associated with the erroneous term "div plate date." In some embodiments, the media guidance application may access a knowledge graph to identify a candidate correction for the erroneous term based on the contextual term and a portion of the first text segment. For example, the media guidance application may access a knowledge graph based on the contextual term "NFL suspension" and a portion ("Tom Brady") of the transcribed sentence "It will be interesting to see how Tom Brady performs despite being in the news for."

In some embodiments, the media guidance application may extract a keyword from the portion of the first text segment. For example, from the portion of the first text segment that does not contain the erroneous term "div plate date," the media guidance application may extract the keyword "Tom Brady." In some embodiments, the media guidance application may search in the knowledge graph for nodes corresponding to the contextual term and the keyword. Continuing with the examples from above, the media guidance application may search for nodes corresponding to the contextual term "NFL suspension" and the keyword "Tom Brady" in the knowledge graph. In some embodiments, the media guidance application may analyze the nodes for properties associated with the contextual term and the keyword. For example, the media guidance application may analyze the "Tom Brady" node and find properties such as Birth Date ("Aug. 3, 1977"), Height ("6 ft. 4 in."), 40-yard Dash Time ("5.28s"), and Team ("New England Patriots"), and analyze the "NFL suspension" node, which contains Names ("Odell Beckham Jr.", "Tom Brady", "Josh Brown" . . . ), Lengths ("1", "4", "1" . . . ), and Reasons ("Collision", "Deflategate", "Personal Conduct" . . . ). In some embodiments, the properties may each correspond to one or more distinct nodes in the knowledge graph. For example, "Personal Conduct" and "Deflategate" may each be a node as well as a property for another node.

In some embodiments, the media guidance application may determine at least one other node based on the properties associated with the contextual term and the keyword, wherein the at least one other node corresponds to the candidate correction. For example, the media guidance application may determine, based on the foregoing properties for "Tom Brady" and "NFL suspension," the "Deflategate" node to be a candidate correction for the erroneous term. In some embodiments, the media guidance application may replace the erroneous term in the first text segment of the on-screen caption text with the candidate correction. For example, the media guidance application may replace the erroneous term "div plate date" with the candidate correction "Deflategate" so that the first text segment now reads "It will be interesting to see how Tom Brady performs despite being in the news for Deflategate."

In some embodiments, the first text segment of the on-screen caption text is time-stamped, and the first video frame is extracted at a position of the media asset corresponding to a position of the time-stamped first text segment. For example, the media guidance application may time-stamp the on-screen caption text and give the first text segment a time-stamp that is equivalent to the absolute time that the sentence was spoken. At or around the same time that the sentence "It will be interesting . . . " is announced, the media guidance application may extract the one or more video frames being displayed from the media asset, such as the video frame with the banner overlay "News of the Hour: Patriots quarterback serves NFL suspension", as used in the examples above. In some further embodiments, the media guidance application may even extract the one or more video frames at substantially the same time as the erroneous term's position in the time-stamped first text segment.

In some embodiments, the media guidance application may identify the erroneous term in a second text segment of the on-screen caption text. For example, the media guidance application may encounter the erroneous term in a second text segment of the on-screen caption text: "Federal investigation into div plate date is ongoing" that is announced shortly after the first text segment. This may provide an opportunity to refine or update the previous correction. In some embodiments, the media guidance application may analyze a second video frame corresponding to the second text segment in order to determine a second contextual term associated with the erroneous term. For example, the media guidance application may analyze a second video frame corresponding to the second text segment, such as a video frame with the New England Patriots versus Indianapolis Colts game, and determines that "Colts," as displayed on the video frame, is a second contextual term that is associated with the erroneous term "div plate date."

In some embodiments, the media guidance application may access the knowledge graph to identify an updated candidate correction based on the first contextual term, the second contextual term, the portion of the first text segment and a portion of the second text segment. This may be helpful if the original candidate correction is incorrect because, for example, the first contextual term and the portion of the first text segment did not lead to an accurate determination of the replacement for the erroneous term. For instance, assuming that the media guidance application has previously determined the candidate correction to be "Detroit Game" rather than "Deflategate," and replaced the erroneous term "div plate date" accordingly, the media guidance application may subsequently access the knowledge graph and identify an updated candidate correction—"Deflategate"—based on more information derived from the media asset, e.g., "NFL suspension" (i.e., the first contextual term), "Colts" (i.e., the second contextual term), "Tom Brady" (i.e., the portion of the first text segment), and "Federal investigation" (i.e., the portion of the second text segment). Generally, the media guidance application may be able to more accurately determine the candidate correction for the erroneous term when there are more information, or clues, to apply to the knowledge graph.

In some embodiments, the media guidance application may replace the erroneous term in the second text segment of the on-screen caption text with the updated candidate correction. For example, the media guidance application may replace the "div plate date" erroneous term in the second text segment "Federal investigation into div plate date is ongoing" with the updated candidate correction—this time correctly identified as "Deflategate"—to produce a corrected second text segment. In some embodiments, the media guidance application may further replace the candidate correction in the first text segment with the updated candidate correction. For example, the media guidance application may go back to replace the erroneous term in "It will be interesting to see how Tom Brady performs despite being in the news for div plate date" to make a universal correction, given that the old candidate correction "Detroit Game" has been rejected in favor of "Deflategate."

In some embodiments, the media guidance application may access the knowledge graph to identify the candidate correction for the erroneous term by determining a plurality of potential corrections for the erroneous term from the knowledge graph and assigning a weight to each potential correction of the plurality of potential corrections based on the determining. For example, to identify the candidate correction "Deflategate" for the erroneous term in the above examples, the media guidance application may first determine a plurality of potential corrections such as "Quarterback", "Detroit Game", and "Deflategate" and assign a weight to each potential correction. In some embodiments, the media guidance application may assign a higher weight for a more recent potential correction of the plurality of potential corrections. For example, out of the three potential corrections listed above, "Deflategate" may be associated with a more recent time-stamp, or may be updated more recently, and therefore may be assigned a higher weight. In some other embodiments, the media guidance application may assign a higher weight for a more "trending" potential correction of the plurality of potential corrections. A "trending" potential correction may be a keyword that has suddenly gained popularity in recent searches, either in terms of absolute number or in terms of frequency of searches. For example, the term "Deflategate" may be a "trending" keyword because the number of unique searches of the word has remained at close to zero until a recent event in the past two weeks, after which the number of unique searches for "Deflategate" went up exponentially. As another example, the frequency of unique searches for the term "Deflategate" may have remained relatively constant until the recent event, and the frequency went up exponentially over the past two weeks, making the term "Deflategate" a "trending" keyword. In some further embodiments, the media guidance application may determine a phonetic similarity score (sometimes defined as the inverse of a phonetic distance) between a potential candidate correction and the erroneous term based on a phonetic algorithm, and assign a higher weight to the potential candidate correction with a higher phonetic similarity score. The media guidance application may calculate the phonetic distance by dividing a speech segment into a string of atomic segments, computing an insertion cost and a deletion cost for each atomic segment, and summing the insertion cost and the deletion cost to arrive at the phonetic distance. For example, the media guidance application may apply a standard phonetic algorithm to the three potential corrections and determine a phonetic similarity score for each potential correction, and assign "Deflategate" a higher score based on its higher phonetic similarity to "div plate date." In this example, the media guidance application may calculate that it requires two deletions ("f" and "g") and three insertions ("v", "p", and "d") to change "Deflategate" into "div plate date." Therefore, the media guidance application may determine the phonetic distance for "Deflategate" to be 5. As can be readily understood by one skilled in the art, the phonetic distances for the other potential corrections—"Quarterback" and "Detroit Game"—are 23 and 17, respectively. Consequently, the media guidance application may calculate that "Deflategate" has the highest phonetic similarity score (as an inverse of the phonetic distance). In some embodiments, the media guidance application may identify a potential correction that is assigned the highest weight as the candidate correction. For example, the media guidance application may identify "Deflategate" out of the three potential corrections as the candidate correction because it has been assigned the highest weight, as calculated in accordance with the above.

In some embodiments, the media guidance application may access the knowledge graph to identify the candidate correction by updating existing nodes of the knowledge graph. For example, the media guidance application may, prior to identifying the candidate correction from the knowledge graph, update a subset or all of the existing nodes in the knowledge graph to ensure they contain up to date information. In some embodiments, each update to the existing nodes may be associated with a time-stamp to indicate when a particular node is last updated. For example, out of nodes A, B, C, D, and E of a knowledge graph, the media guidance application may update existing nodes A, B, and D during an access to the knowledge graph at a given time, but does not update node C because node C already contains up to date information, and cannot update node E because of a time constraint. Here, existing nodes A, B, and D of the knowledge graph will be time-stamped with the current time, whereas nodes C and E's time stamps will not be updated, and will still reflect their respective most recent update. This way, the media guidance application may maintain the knowledge graph to ensure it contains up to date information in order to be useful for determining candidate corrections.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
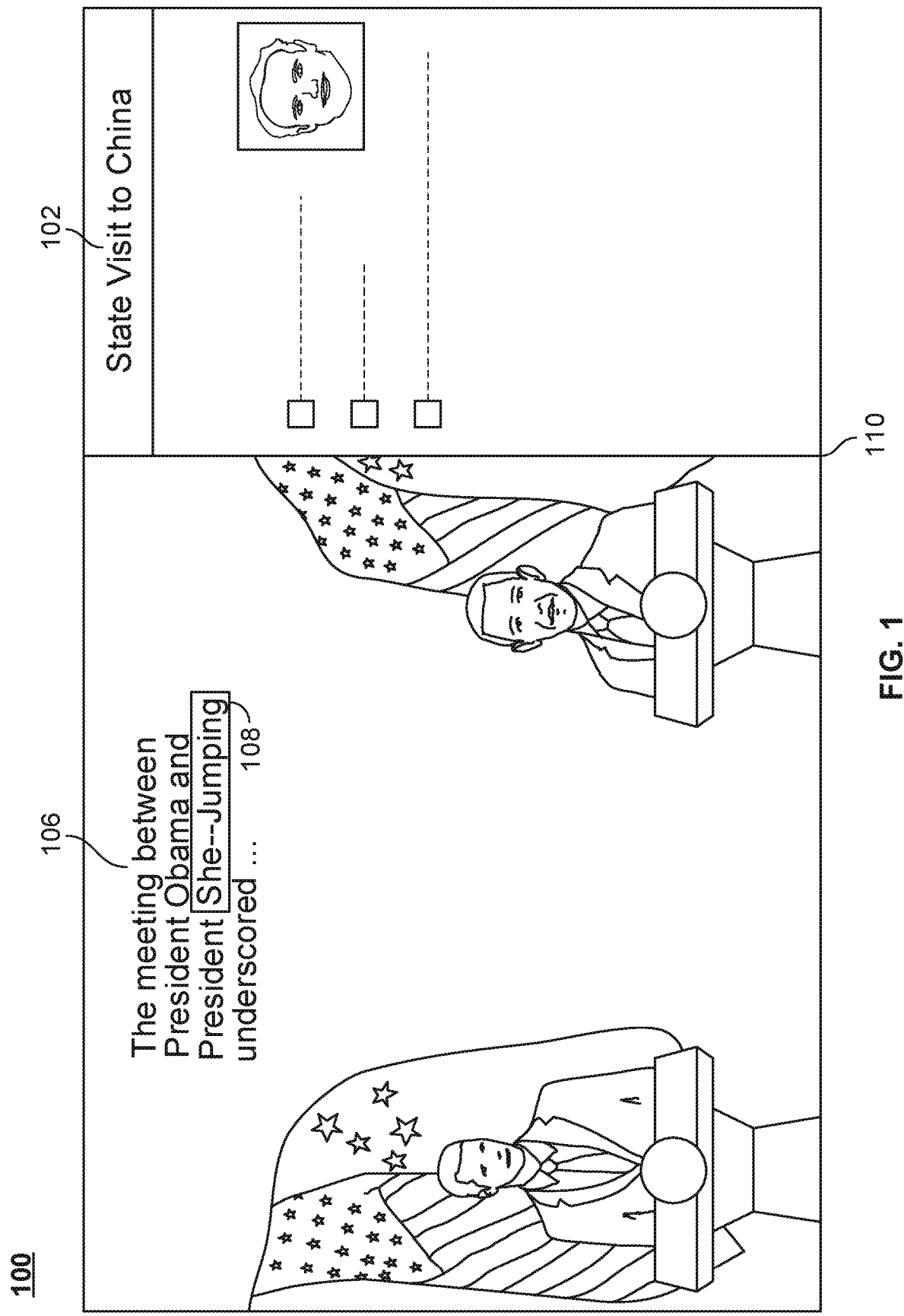
FIG. 1 shows an illustrative example of a display screen generated by a media guidance application in accordance with some embodiments of the disclosure.

Systems and methods are described to address shortcomings in conventional media systems by automatically correcting errors in on-screen caption text of a media asset's audio transcription. The systems and methods may be implemented via a media guidance application running on a user device (e.g., user equipment device 700 (FIG. 7)), a remote server (e.g., media content source 816 or media guidance data source 818 (FIG. 8)), or another suitable device.

In some embodiments, a media guidance application corrects the errors by accessing a knowledge graph based on information derived from the media asset itself and looks for candidate replacements or corrections for the errors from within the knowledge graph. The media guidance application may be implemented partially on multiple devices such that some portions of the media guidance application are executed on one device while other portions of the media guidance application are executed on another device. The knowledge graph may be on a server, such as media content source 816 or media guidance data source 818, or on any other servers or databases that are maintained and accessible from the media guidance application. In some embodiments, the information derived from the media asset may be texts or images that appear in video frames of the media asset surrounding the errors, and can be identified by performing textual or image recognition on the video frames. The textual or image recognition may be performed by the media guidance application using any of a number of techniques, such as various optical character recognition algorithms, image recognition algorithms, and other machine learning techniques. Additionally, the information may also be derived from the correctly recognized portions of the on-screen caption text itself. Here, the media guidance application may apply one or more text parsing and keyword extraction algorithms on the portions of the on-screen caption text that have already been correctly recognized. In some embodiments, the media guidance application may consider a portion of the on-screen caption text to be correctly recognized if the portion passes a natural language processing (NLP) processor and returns no grammar errors according to the grammar rules specified by the NLP processor.

In some embodiments, the media guidance application may determine one or more potential corrections for the errors by accessing the knowledge graph. The knowledge graph may comprise nodes and links arranged in a linked data format, whereby a node indicates a conceptual entity and a link represents a relationship between two or more nodes. The knowledge graph may be pre-populated by the media guidance application with data collected over time, and may be periodically updated to include new nodes and links, which reflect information that are related to existing nodes of the knowledge graph. In some embodiments, the knowledge graph may be maintained by a third-party service, such as a third-party knowledge database, whereby the media guidance application is capable of accessing the knowledge graph via an application programming interface (API) offered by the third-party service. In this implementation, the third-party service is responsible for constructing, maintaining, and updating the knowledge graph. In some embodiments, the knowledge graph may be generic and could include information on anything at any time. In some other embodiments, the media guidance application may maintain a contextual knowledge graph that is dedicated to a particular subject area, a particular time period, and the like. These may be referred to as a sub-knowledge graph or a contextual knowledge graph. Two exemplary knowledge graphs that may be used in accordance with some embodiments of the present disclosure are presented and discussed in relation to FIGS. 2-3 below.

To determine the one or more potential corrections for the errors, the media guidance application may access a suitable knowledge graph and search for one or more nodes representing the information derived from the media asset. As previously discussed, the information derived from the media asset may include one or more contextual terms determined from the video frames and one or more keywords extracted from the on-screen caption text. In some embodiments, the media guidance application may examine all other nodes in the knowledge graph that are linked to at least one of the one or more nodes representing such information, and optionally construct a sub-knowledge graph that is self-contained with the one or more nodes and their immediate neighboring nodes. These nodes may each represent a potential correction for the errors.

In some embodiments, the media guidance application may weigh the one or more potential corrections determined above, based on their phonetic similarity to the errors, in order to select a candidate correction having the highest weight. Besides phonetic similarity, the media guidance application may weigh the potential corrections based on any number of other criteria, such as by their time stamps, which indicate how up to date their corresponding nodes are. In some embodiments, the media guidance application may then replace the errors with the candidate correction and present an error-free on-screen caption text to viewers.

FIG. 1 shows an illustrative example of display screen 100 generated by a media guidance application in accordance with some embodiments of the disclosure. In display screen 100, the media guidance application makes a mistake in transcribing the name for the current Chinese president, Xi Jinping, in on-screen caption text 106 during a news broadcast. Rather than displaying an intelligible sentence, the media guidance application displays on-screen caption text 106: "The meeting between President Obama and President She—Jumping underscored . . . " This illustrative example demonstrates the failure of existing on-screen caption text systems that implement a traditional automated transcription service, or systems that employ human stenographers who are not aware of the particular term in question (in this case, the name of the current Chinese president). In accordance with the current disclosure, however, the media guidance application implemented in system 800 may apply one or more NLP rules to on-screen caption text 106 and determine that "She—Jumping" 108 is an erroneous term because it fails to adhere to one or more grammar rules.

To correct the erroneous term, the media guidance application may extract keywords from the correctly recognized portions of the on-screen caption text 106, such as "President," and access a knowledge graph based on the term. The media guidance application may also perform OCR of video frame 110, which corresponds to a position in the media asset that is equivalent to the position of on-screen caption text 106 in the media asset. For example, the media guidance application may generate for display video frame 110 on display 712 at substantially the same time that on-screen caption text 106 is announced in the audio stream of the news broadcast. Based on the OCR of video frame 110, the media guidance application may recognize contextual terms such as "China" and "State Visit" from information panel 102. Alternatively, or in addition to performing a textual recognition such as OCR of video frame 110, the media guidance application may perform an image recognition of the characters shown in video frame 110 to further identify contextual terms that is associated with the erroneous term. For example, if the Chinese president in video frame 110 receives a close camera shot, the media guidance application may perform an image recognition on his identity and arrive at the contextual term "Xi Jinping," which incidentally corresponds to the real identity of the erroneous term "She—Jumping."

The media guidance application may access the knowledge graph based on these contextual terms in addition to the keywords extracted from on-screen caption text 106. By analyzing nodes and properties associated with these terms in the knowledge graph, the media guidance application may identify a number of potential corrections related to "President," "China," and "State Visit," such as "Xi Jinping" and "Hu Jintao" (President Xi Jinping and former President Hu Jintao have each hosted President Obama's state visits to China on separate occasions). The media guidance application may then replace "She—Jumping" in the original text segment with "Xi Jinping".

Figure 2:
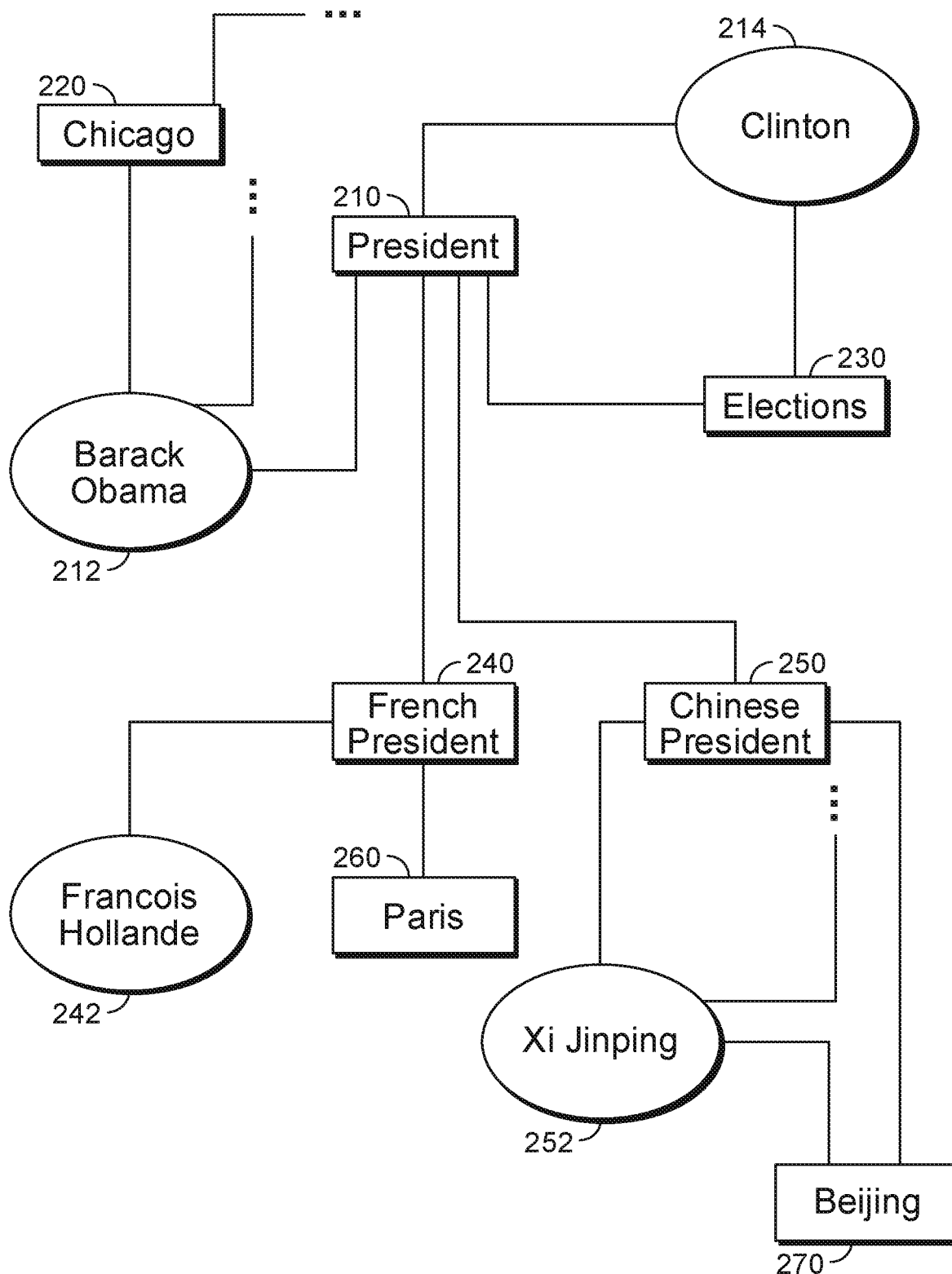
FIG. 2 shows an illustrative embodiment of a portion of a knowledge graph associated with a text segment in accordance with some embodiments of the disclosure.

FIG. 2 shows an illustrative embodiment of a portion of a knowledge graph associated with a text segment in accordance with some embodiments of the disclosure. In some embodiments, the illustrative portion of the knowledge graph shown in FIG. 2 may be part of a generic knowledge graph that can include any information or concept. Nodes 210, 212, 214 . . . 270 shown in the knowledge graph correspond to concepts that each contain one or more properties. For instance, node 212 "Barack Obama" may include several fields, or properties, including Date of Birth, Height, Occupation, Education, and the like. Connections between pairs of nodes represent links that indicate various relationships that the nodes may have. For instance, node 212 may be linked to node 210 because "Barack Obama" is a "President". Node 212 may also be linked to node 220 because "Barack Obama" used to live and teach in "Chicago". In some embodiments, the nodes may be further differentiated or grouped based on their underlying data structures. For instance, in the illustrative portion of the knowledge graph in FIG. 2, circular nodes 212, 214, 242, and 252 are used to represent human individuals, whereas rectangular nodes 210, 220, 230, 240, 250, 260, and 270 are used to represent entities or concepts that are not tied to a human individual. It is understood that this particular representation of the different nodes (i.e., circular vs. rectangular nodes) is illustrative only and is by no means limiting to the underlying concept.

To access the illustrative portion of the knowledge graph, or sub-knowledge graph, as shown in FIG. 2, the media guidance application may provide information that is derived from the media asset as starting nodes, as explained above. For example, the media guidance application may access the sub-knowledge graph by providing terms such as "Barack Obama" and "Chinese President." While "Barack Obama" 212 and "Chinese President" 250 are nodes themselves, the media guidance application may bring up all other related nodes (nodes that share at least one link to "Barack Obama" 212 or "Chinese President" 250) as potential corrections for the erroneous term, to evaluate. As illustrated previously in relation to FIG. 1, the media guidance application may assign a higher weight to a node that is phonetically similar to the erroneous term based on a phonetic algorithm. In this case, the closest node from FIG. 2 to "She—Jumping" is "Xi Jinping" 252. Consequently, the media guidance application may choose "Xi Jinping" as the candidate correction to replace the erroneous term "She—Jumping."

Figure 3:
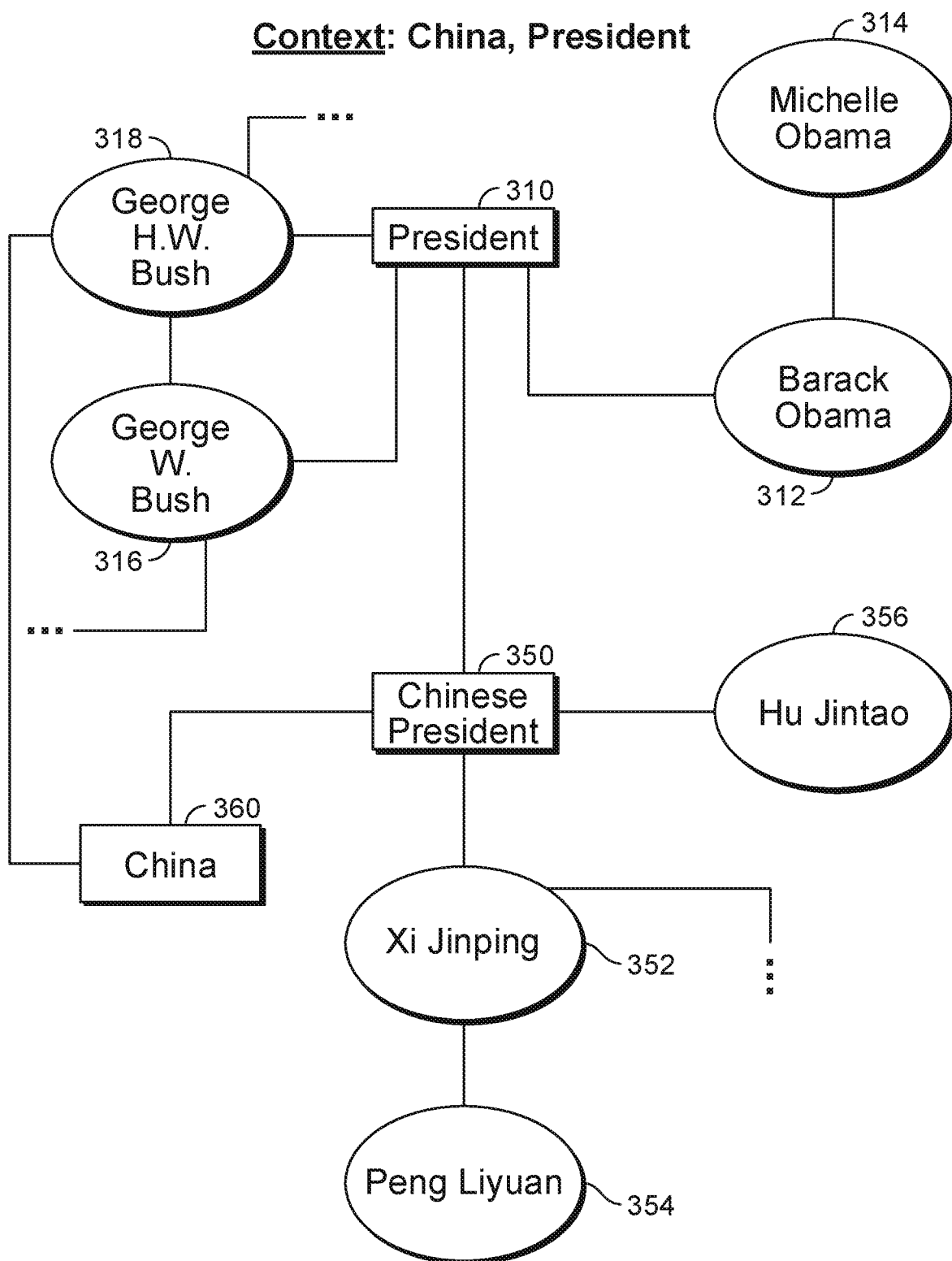
FIG. 3 shows another illustrative embodiment of a portion of a knowledge graph associated with a text segment in accordance with some embodiments of the disclosure.

FIG. 3 shows another illustrative embodiment of a portion of a knowledge graph associated with a text segment in accordance with some embodiments of the disclosure. The portion of the knowledge graph or sub-knowledge graph in FIG. 3 may, in some embodiments, be a context-specific version of the sub-knowledge graph in FIG. 2. In particular, nodes in the sub-knowledge graph in FIG. 3 may all relate to the context "China" and "President," as set by the contextual term and the keywords from the first text segment. Effectively, the media guidance application may filter a large, generic knowledge graph based on the contextual term or the keywords in order to produce the sub-knowledge graph in FIG. 3.

Nodes 310, 312, 350, and 352 of the sub-knowledge graph in FIG. 3 may substantially correspond to nodes 210, 212, 250, and 252 of the sub-knowledge graph in FIG. 2, respectively. Additional nodes "George W. Bush" 316 and "George H. W. Bush" 318 appear in the sub-knowledge graph of FIG. 3 because they are related to the concept of "President" or "China," or both. For example, node "George H. W. Bush" 318 may share a link with node "China" 360 because the President George H. W. Bush previously served as the chief U.S. envoy to China.

As previously discussed, the concept of nodes and properties are exchangeable in some embodiments. For example, node "Michelle Obama" 314 may concurrently be registered under node "Barack Obama" 312 as a family member (i.e., a property of the node "Barack Obama" 312), and at the same time may be a separate node itself. Similarly, node "Xi Jinping" may be registered under node "Peng Liyuan" 354 as a family member and concurrently be an independent node that links to other existing nodes in the knowledge graph. In some embodiments, the media guidance application may return all nodes and properties associated with the contextual term and the keyword in a knowledge graph as potential corrections, and evaluate them individually to determine a candidate correction for the erroneous term. For example, based on the sub-knowledge graph of FIG. 3, the media guidance application may identify "Michelle Obama" 314, "George W. Bush" 316, "George H. W. Bush" 318, "Xi Jinping" 352, "Peng Liyuan" 354, and "Hu Jintao" 356 as potential corrections for the erroneous term "She—Jumping" in the examples used above. From these potential corrections, the media guidance application may apply the various weighing mechanisms to determine "Xi Jinping" to be the candidate correction.

Figure 4:
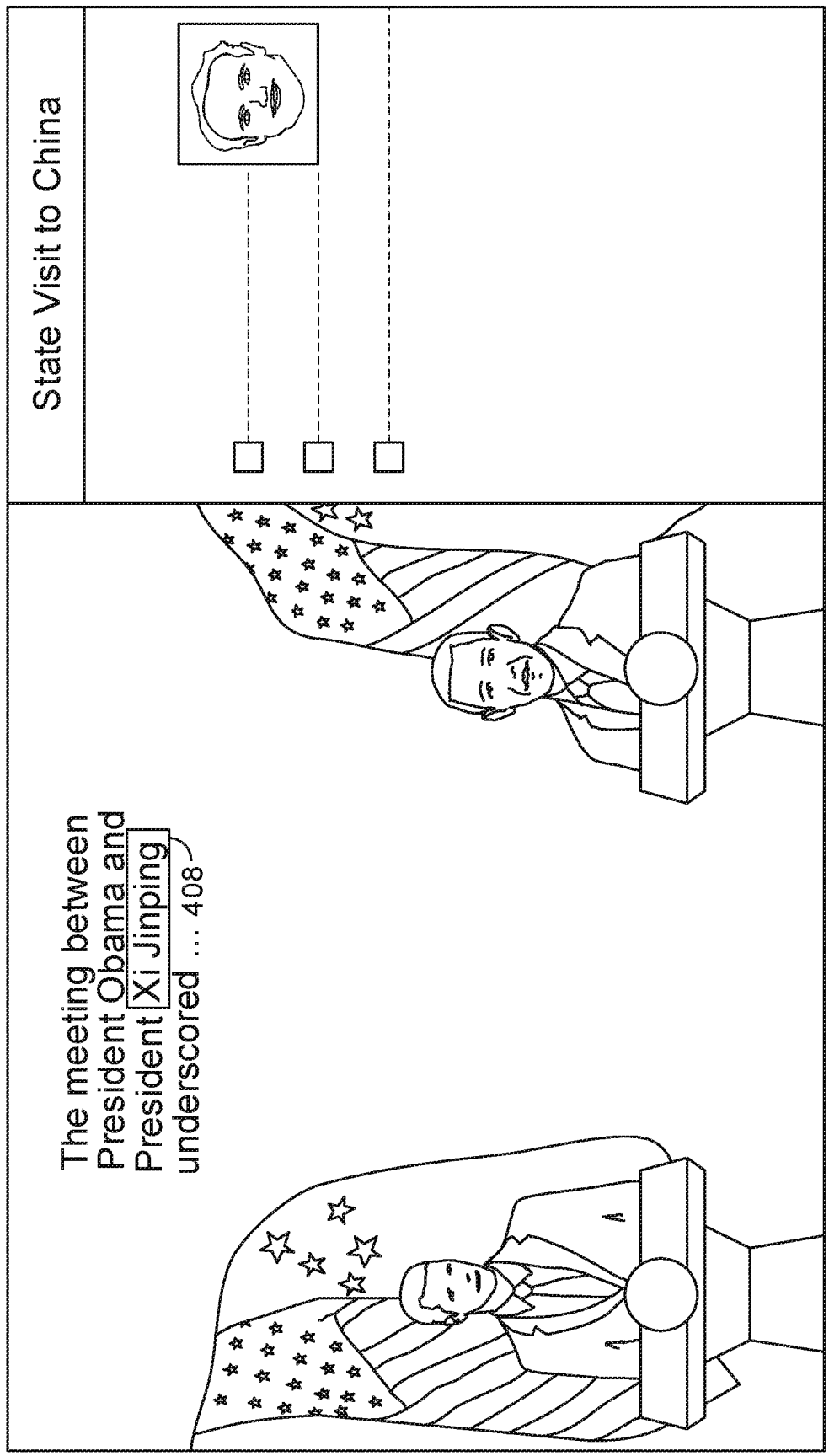
FIG. 4 shows another illustrative example of a display screen generated by a media guidance application in accordance with some embodiments of the disclosure.

Knowledge graphs such as the illustrative ones in FIGS. 3 and 4 may be periodically maintained and updated. In some embodiments, the media guidance application may update nodes and properties that are directly linked to a node of inquiry at the time of the inquiry. For example, the media guidance application may access the knowledge graph based on the term "President," which corresponds to node "President" 310. With this inquiry, the media guidance application may retrieve nodes linked to "President" 310, such as "Barack Obama" 312, "George W. Bush" 316, and "George H. W. Bush" 318, and update their node and property information. In some embodiments, such updates may be carried through the second or subsequent layers of linked data, such as updating the retrieved nodes 310, 312, 316, and 318, as well as second-degree nodes that are linked to nodes 310, 312, 316, and 318.

In some embodiments, the media guidance application may update every node of the knowledge graph periodically, by pulling and examining authoritative sources at fixed intervals. In some embodiments, the media guidance application may update the nodes and properties by groups. In some further embodiments, the media guidance application may perform the updating in real time, such as by linking the nodes directly to an API service of the authoritative sources. For example, the media guidance application can implement an automatic update for the node "Barack Obama" 312 by linking it to an API of an online encyclopedia, a news service, or the White House official news portal in order to receive real-time updates. Upon receiving a real-time update for a particular node, the media guidance application may enter new properties for the node, update existing properties, delete properties, add new links to existing or new nodes, or create new nodes to be linked to the particular node.

FIG. 4 shows another illustrative example of a display screen generated by a media guidance application in accordance with some embodiments of the disclosure. On display screen 400, the media guidance application has applied candidate correction 408 to replace erroneous term 108 in on-screen caption text 106. Everything else on display screen 400 may stay the same as display screen 100. In some embodiments, the media guidance application may replace erroneous term 108 with candidate correction 408 prior to even displaying on-screen caption text 106, such that the viewers will only see the correct on-screen caption. In some embodiments, the media guidance application may perform the replacement at substantially the same time as displaying on-screen caption text 106, but after on-screen caption text 106 has been generated for display to the viewers. The replacement may be seamless and instantaneous so that most viewers may not notice. Indeed, in such implementations, the media guidance application may not want to draw the viewers' attention to the replacement. In some other implementations, the media guidance application may perform the replacement with a short burst of highlight to emphasize candidate correction 408, in order to draw the viewers' attention to the corrected term, so the viewers are not left confused about the meaning of the erroneous term, not realizing that a correction has been made. In some further embodiments, the media guidance application may go back to replace erroneous term 108 after having moved on to the next few sentences in the on-screen caption text, because the candidate correction that was previously used to replace erroneous term 108 was incorrect. In such embodiments, the media guidance application may use a short burst of highlight, or any other means of emphasis, to indicate to the viewers that an updated correction has been made to an on-screen caption sentence a few sentences ago. These and other means of displaying the corrected erroneous term in an on-screen captioning system are illustrative in nature and do not limit the present disclosure to the specific embodiments discussed herein.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

As referred to herein, an "interactive media guidance application," or a "media guidance application" or, sometimes, a "guidance application," is an application that allows a user to consume and/or navigate to content. In some embodiments, the media guidance application may be provided as an online application (i.e., provided on a website), or as a stand-alone application on a server or a user device. In some embodiments, control circuitry installed on various devices and platforms may execute the media guidance application, as described in more detail below. In some embodiments, the media guidance application and/or any instructions for performing any of the embodiments discussed herein may be encoded on machine-readable media. Machine-readable media includes any media capable of storing data. The machine-readable media may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, media card, register memory, processor caches, Random Access Memory ("RAM").

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on machine-readable media. Machine-readable media includes any media capable of storing data. The machine-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
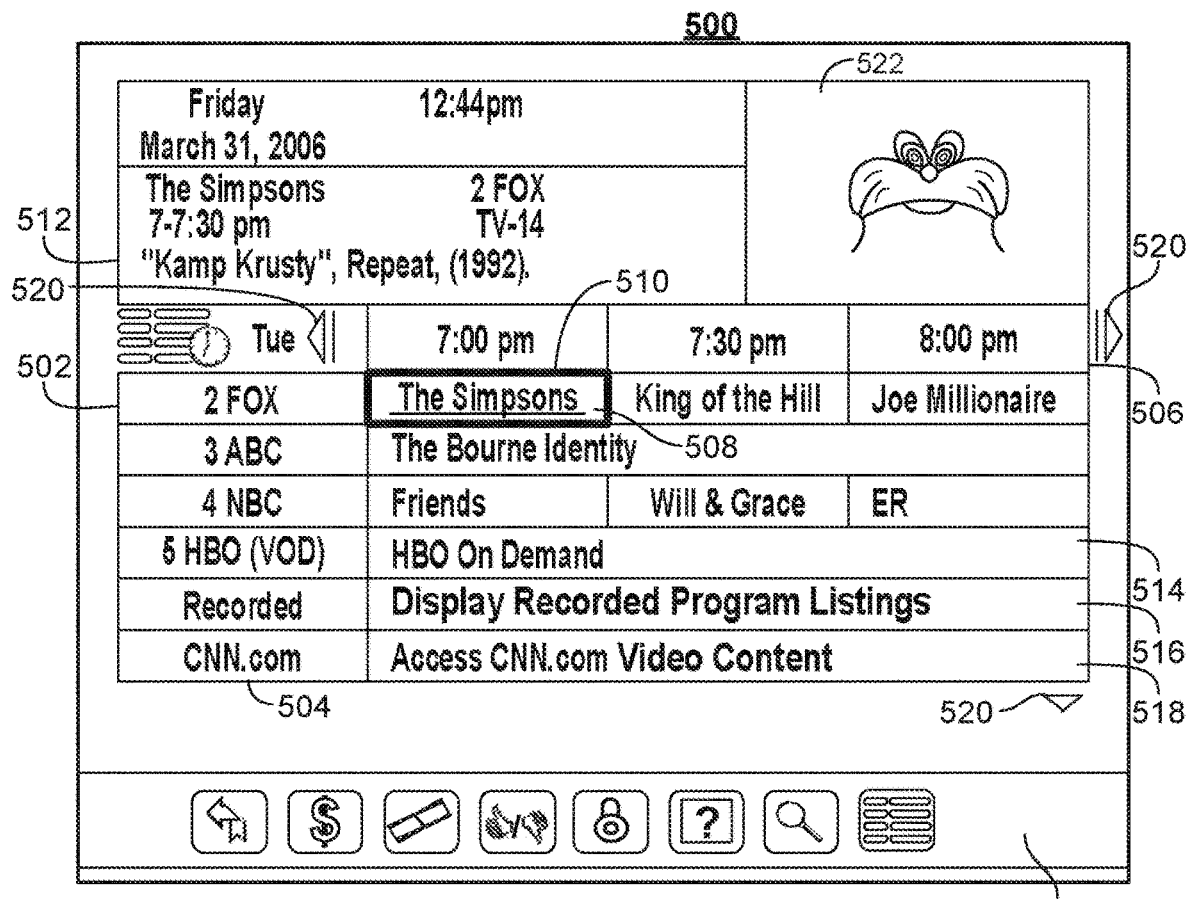
FIG. 5 shows yet another illustrative example of a display screen generated by a media guidance application in accordance with some embodiments of the disclosure.
Figure 6:
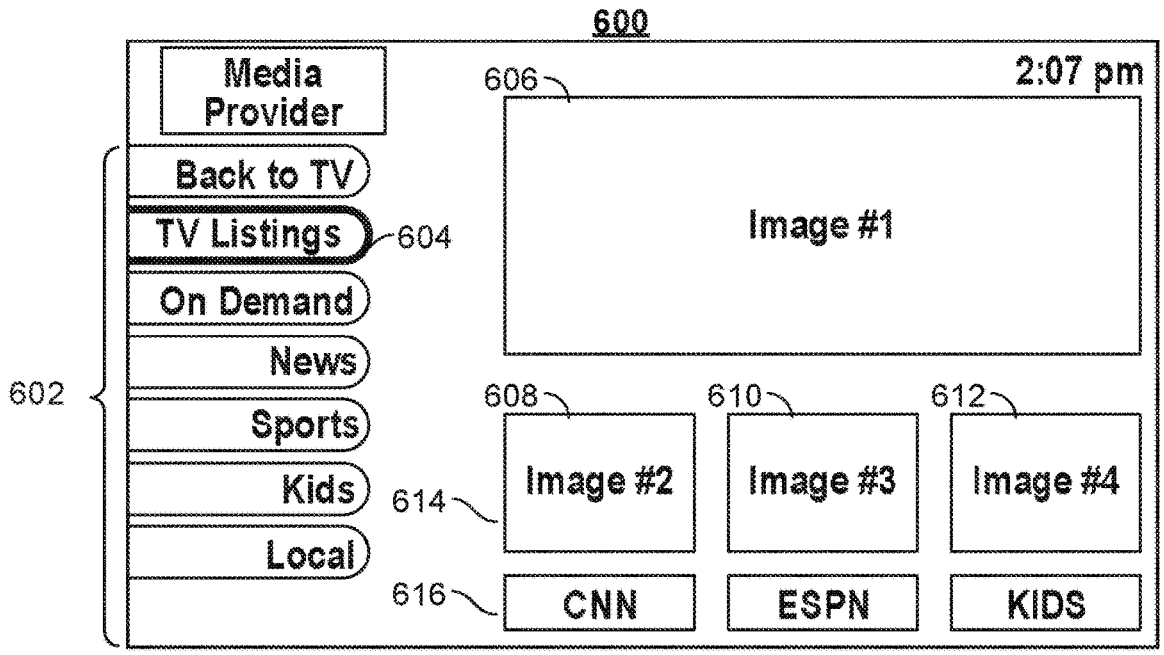
FIG. 6 shows yet another illustrative example of a display screen generated by a media guidance application in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
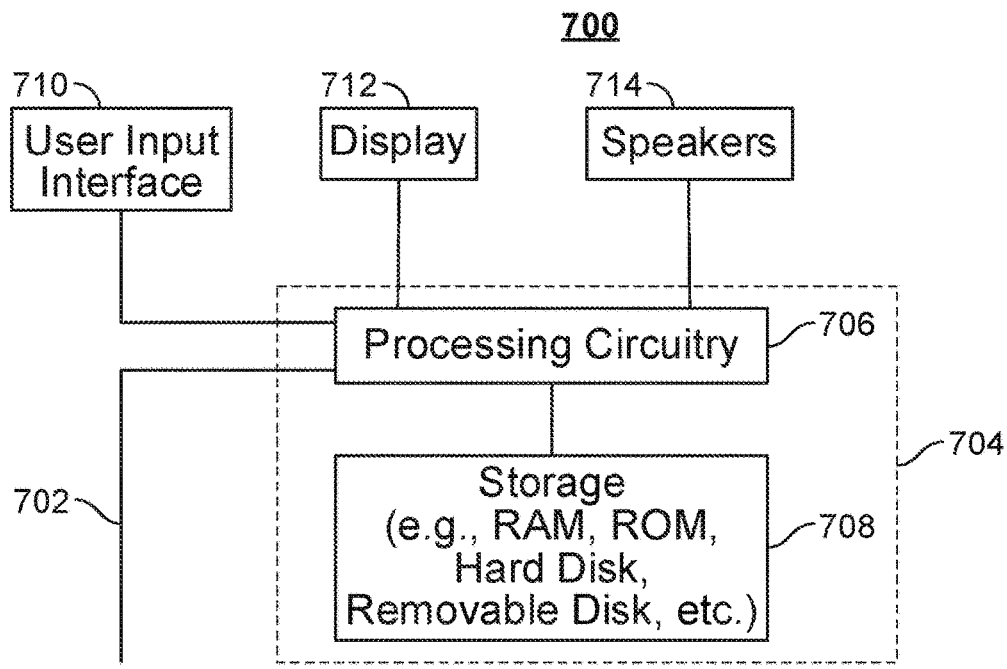
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
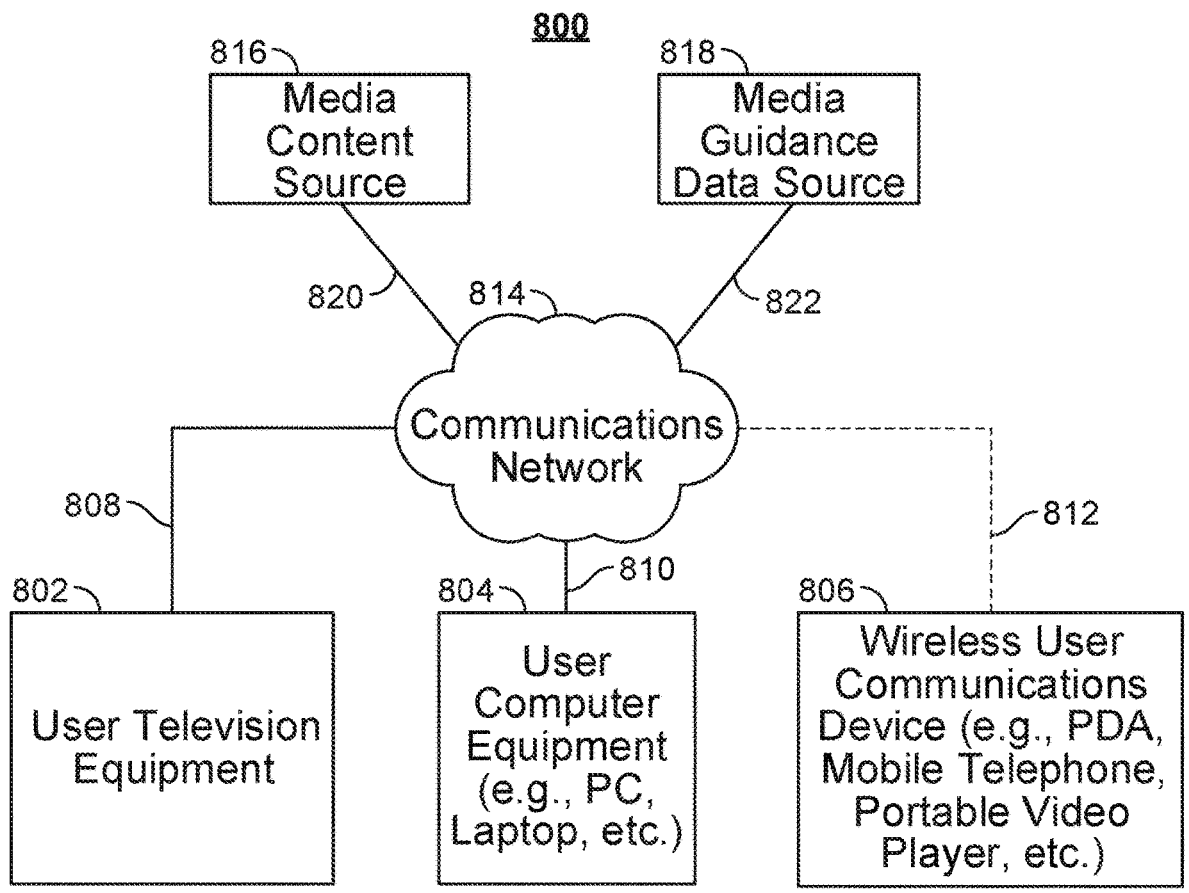
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third-party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
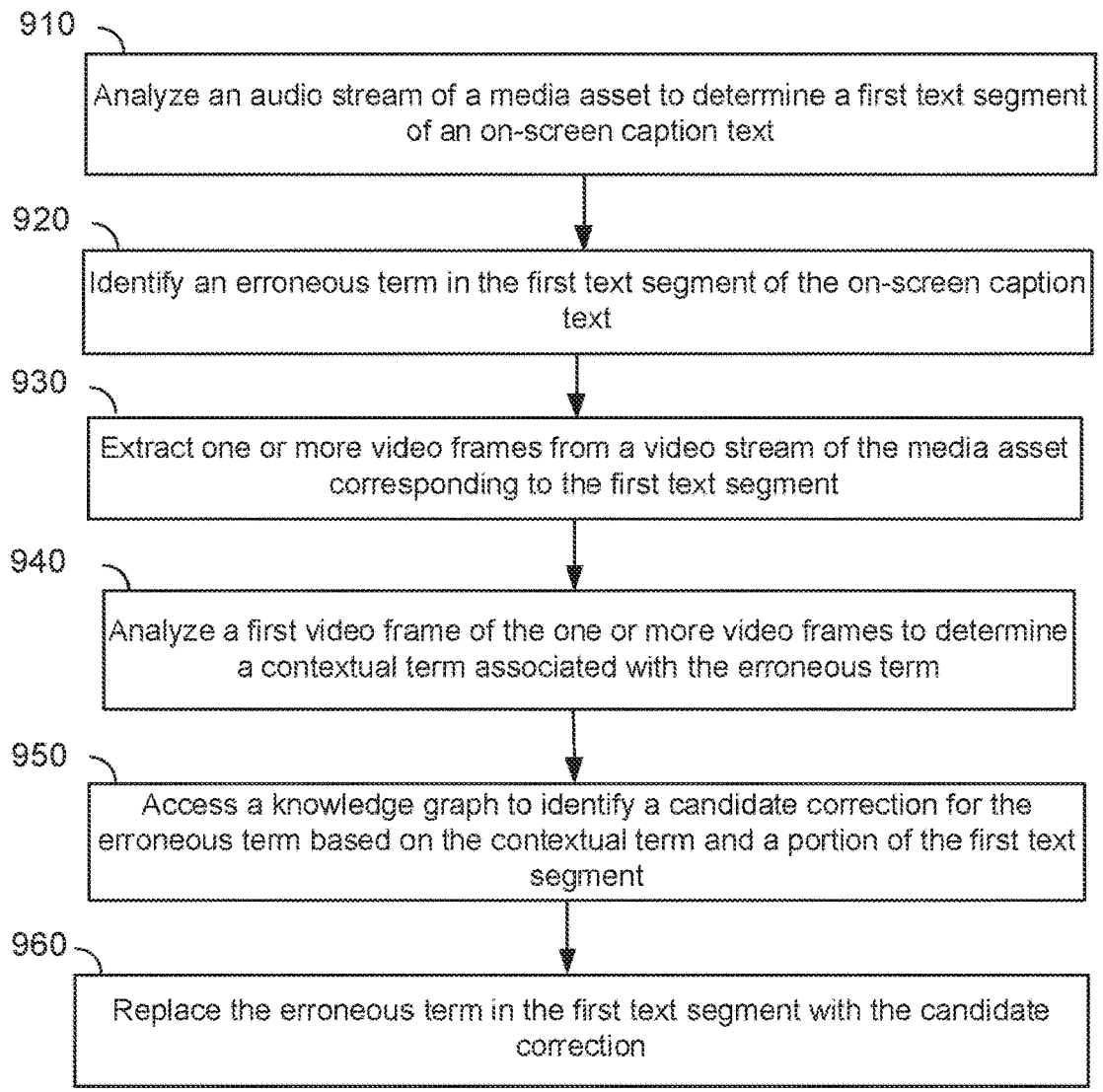
FIG. 9 is a flowchart of an illustrative process for correcting an erroneous term in on-screen caption text for a media asset displayed using a media guidance application in accordance with some embodiments of the disclosure.

FIG. 9 is a flowchart of an illustrative process 900 for control circuitry (e.g., control circuitry 704) to correct an erroneous term in on-screen caption text for a media asset displayed using a media guidance application in accordance with some embodiments of the disclosure. In some embodiments this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

An interactive media guidance application may cause control circuitry 704 to initialize the process for correcting an erroneous term in on-screen caption text of a media asset presented on a media guidance application. At step 910, the media guidance application may cause control circuitry 704 to analyze an audio stream of the media asset to determine a first text segment of the on-screen caption text. For example, the media guidance application may analyze the audio stream of a sports news commentary and automatically transcribe it into an on-screen caption text. The media guidance application may then cause control circuitry 704 to determine a first text segment of the on-screen caption text to be "It will be interesting to see how Tom Brady performs despite being in the news for div plate date."

At step 920, the media guidance application may cause control circuitry 704 to identify an erroneous term in the first text segment of the on-screen caption text. For example, the media guidance application may cause control circuitry 704 to identify that "div plate date" is an erroneous term in the first text segment. In some embodiments, the media guidance application may identify the erroneous term by performing natural language processing on the first text segment to compare the first text segment against a plurality of grammar rules. For example, the media guidance application may compare the sentence above against a grammar rule that requires the word "div" be followed by a number (e.g., as in "NCAA div one") and determine that "div plate date" is an erroneous term because it conflicts with the grammar rule.

At step 930, the media guidance application may cause control circuitry 704 to extract one or more video frames from a video stream of the media asset corresponding to the first text segment. For example, the media guidance application may cause control circuitry 704 to extract a video frame from the media asset corresponding to the time that the sentence above appeared in the audio stream. The video stream may be a news interview of Tom Brady, which includes a few video frames displaying the following sentence in a banner overlaying the interview: "News of the Hour: Patriots quarterback serves NFL suspension." The media guidance application may cause control circuitry 704 to extract these video frames because they correspond to substantially the same time as the sentence "It will be interesting to see how Tom Brady performs despite being in the news for div plate date" is announced on the news.

At step 940, the media guidance application may cause control circuitry 704 to analyze a first video frame of the one or more video frames to determine a contextual term associated with the erroneous term. For example, the media guidance application may cause control circuitry 704 to analyze the video frame with the banner overlay and determine that the contextual terms "Patriots" and "NFL suspension" from the banner are associated with the erroneous term "div plate date."

At step 950, the media guidance application may cause control circuitry 704 to access a knowledge graph to identify a candidate correction for the erroneous term based on the contextual term and a portion of the first text segment. For example, the media guidance application may cause control circuitry 704 to access a knowledge graph based on the contextual term "NFL suspension" and a portion of the transcribed sentence "Tom Brady," and identify "Deflategate" as the candidate correction for the erroneous term. In some embodiments, the knowledge graph may be stored in a database that is accessible by control circuitry 704, such as storage 708, media content source 816, or media guidance data source 818.

At step 960, the media guidance application may cause control circuitry 704 to replace the erroneous term in the first text segment of the on-screen caption text with the candidate correction. For example, the media guidance application may cause control circuitry 704 to replace the erroneous term "div plate date" with the candidate correction "Deflategate" so that the first text segment now reads "It will be interesting to see how Tom Brady performs despite being in the news for Deflategate."

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations, such as those at step 950, may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 7-8 could be used to implement one or more portions of the process.

Figure 10:
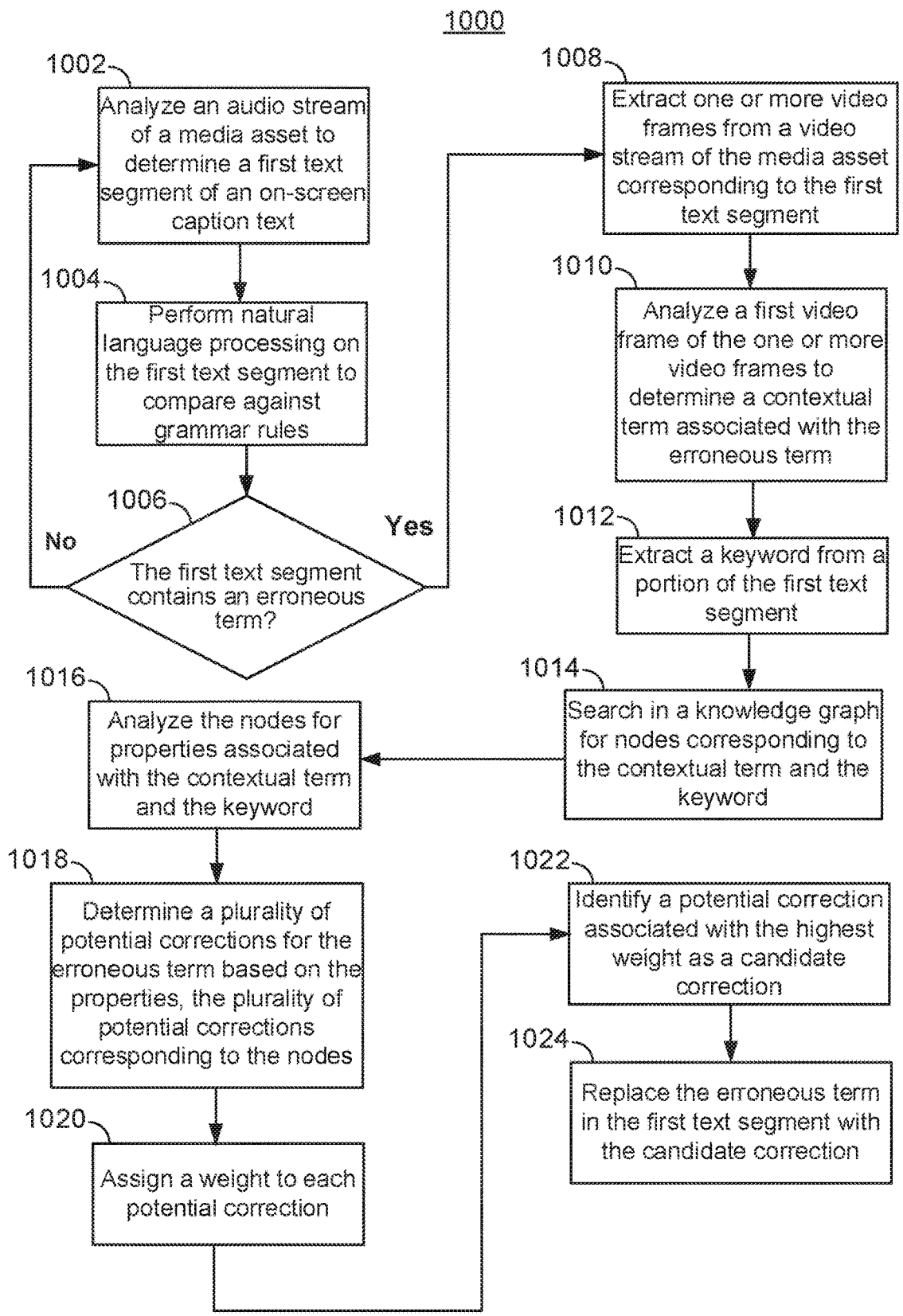
FIG. 10 is a flowchart of an illustrative process for identifying and replacing an erroneous term in on-screen caption text for a media asset using a knowledge graph in accordance with some embodiments of the disclosure.

FIG. 10 is a flowchart of an illustrative process 1000 for control circuitry (e.g., control circuitry 704) to identify and replace an erroneous term in on-screen caption text for a media asset using a knowledge graph in accordance with some embodiments of the disclosure. In some embodiments this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 1002, the media guidance application may cause control circuitry 704 to analyze an audio stream of a media asset to determine a first text segment of an on-screen caption text.

At step 1004, the media guidance application may cause control circuitry 704 to perform natural language processing on the first text segment to compare the first text segment against a plurality of grammar rules. For example, the media guidance application may compare the sentence "It will be interesting to see how Tom Brady performs despite being in the news for div plate date" (as used in the example of FIG. 9), against a grammar rule that requires the word "div" be followed by a number (e.g., as in "NCAA div one") and determine that "div plate date" is an erroneous term because it conflicts with the grammar rule.

At step 1006, the media guidance application may cause control circuitry 704 to determine if the first text segment contains an erroneous term. If the first text segment does not contain any erroneous term, the media guidance application will return to step 1002 and analyze a next audio stream. If, however, the first text segment contains an erroneous term, the media guidance application will cause control circuitry 704 to proceed to step 1008 to attempt to correct the erroneous term. In the above example, the media guidance application may determine that the sentence contains the erroneous term "div plate date" and therefore should proceed to step 1008.

At step 1008, the media guidance application may cause control circuitry 704 to extract one or more video frames from a video stream of the media asset corresponding to the first text segment. For example, the media guidance application may cause control circuitry 704 to extract a video frame from the media asset corresponding to the time that the sentence above appeared in the audio stream. The video stream may be a news interview of Tom Brady, which includes a few video frames displaying the following sentence in a banner overlaying the interview: "News of the Hour: Patriots quarterback serves NFL suspension." The media guidance application may cause control circuitry 704 to extract these video frames because they correspond to substantially the same time as the sentence "It will be interesting to see how Tom Brady performs despite being in the news for div plate date" is announced on the news.

At step 1010, the media guidance application may cause control circuitry 704 to analyze a first video frame of the one or more video frames to determine a contextual term associated with the erroneous term. For example, the media guidance application may cause control circuitry 704 to analyze the video frame with the banner overlay and determine that the contextual terms "Patriots" and "NFL suspension" from the banner are associated with the erroneous term "div plate date."

At step 1012, the media guidance application may cause control circuitry 704 to extract a keyword from the portion of the first text segment. For example, from the portion of the first text segment that does not contain the erroneous term "div plate date," the media guidance application may extract the keyword "Tom Brady."

At step 1014, the media guidance application may cause control circuitry 704 to search in the knowledge graph for nodes corresponding to the contextual term and the keyword. Continuing with the examples from above, the media guidance application may search for nodes corresponding to the contextual term "NFL suspension" and the keyword "Tom Brady" in the knowledge graph.

At step 1016, the media guidance application may cause control circuitry 704 to analyze the nodes for properties associated with the contextual term and the keyword. For example, the media guidance application may analyze the "Tom Brady" node and find properties such as Birth Date ("Aug. 3, 1977"), Height ("6 ft. 4 in."), 40-yard Dash Time ("5.28s"), and Team ("New England Patriots"), and analyze the "NFL suspension" node, which contains Names ("Odell Beckham Jr.", "Tom Brady", "Josh Brown" . . . ), Lengths ("1", "4", "1" . . . ), and Reasons ("Collision", "Deflategate", "Personal Conduct" . . . ). In some embodiments, the properties may each correspond to one or more distinct nodes in the knowledge graph. For example, "Personal Conduct" and "Deflategate" may each be a node as well as a property for another node.

At step 1018, the media guidance application may cause control circuitry 704 to determine a plurality of potential corrections for the erroneous term from the knowledge graph. At step 1020, the media guidance application may cause control circuitry 704 to assign a weight to each potential correction of the plurality of potential corrections based on the determining. For example, to identify the candidate correction "Deflategate" for the erroneous term in the above examples, the media guidance application may first determine a plurality of potential corrections such as "Quarterback", "Detroit Game", and "Deflategate" and assign a weight to each potential correction.

At step 1022, the media guidance application may cause control circuitry 704 to identify a potential correction that is associated with a highest weight as a candidate correction. For example, the media guidance application may identify "Deflategate" out of the three potential corrections as the candidate correction because it has been assigned the highest weight.

At step 1024, the media guidance application may cause control circuitry 704 to replace the erroneous term in the first text segment of the on-screen caption text with the candidate correction. For example, the media guidance application may cause control circuitry 704 to replace the erroneous term "div plate date" with the candidate correction "Deflategate" so that the first text segment now reads "It will be interesting to see how Tom Brady performs despite being in the news for Deflategate."

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for correcting an erroneous term in on-screen caption text of a media asset, comprising:
    identifying an erroneous term in a text segment of the on-screen caption text;
    extracting a video frame from a video stream of the media asset corresponding to the text segment;
    identifying a non-textual visual object in the video frame associated with the erroneous term, wherein the non-textual visual object comprises an image of a person;
    analyzing the non-textual visual object in the video frame, using image recognition, to determine a contextual term associated with the erroneous term, wherein the contextual term comprises the identity of the person;
    accessing a data structure to identify a candidate correction for the erroneous term based on the contextual term and a portion of the text segment; and
    replacing the erroneous term in the text segment of the closed captioning text with the candidate correction.

2. The method of claim 1 further comprising:
    determining the text segment of the on-screen caption text by analyzing an audio stream of the media asset.

3. The method of claim 1, wherein the identifying the erroneous term in the text segment further comprises performing natural language processing on the text segment to determine that the text segment conflicts with a plurality of grammar rules.

4. The method of claim 1, wherein the text segment of the on-screen caption text is time-stamped, and wherein the video frame is extracted at a position of the media asset corresponding to a position of the erroneous term in the time-stamped text segment.

5. The method of claim 1, wherein accessing the data structure to identify the candidate correction based on the contextual term and the portion of the text segment further comprises:
    extracting a keyword from the portion of the text segment;
    searching in the data structure for nodes corresponding to the contextual term and the keyword;
    analyzing the nodes for properties associated with the contextual term and the keyword; and
    determining at least one other node based on the properties associated with the contextual term and the keyword, wherein the at least one other node corresponds to the candidate correction.

6. The method of claim 1, wherein accessing the data structure to identify the candidate correction for the erroneous term further comprises:
    determining a plurality of potential corrections for the erroneous term from the data structure;
    assigning a weight to each potential correction of the plurality of potential corrections based on the determining; and
    identifying a potential correction associated with a highest weight as the candidate correction.

7. The method of claim 6, wherein a more recent potential correction of the plurality of corrections is assigned a higher weight.

8. The method of claim 6, further comprising:
    determining a phonetic similarity score between a potential candidate correction and the erroneous term based on a phonetic algorithm; and
    assigning a higher weight to the potential candidate correction with a higher phonetic similarity score.

9. The method of claim 1, wherein accessing the data structure to identify the candidate correction based on the contextual term and the portion of the text segment further comprises updating existing nodes of the data structure.

10. A system for correcting an erroneous term in on-screen caption text of a media asset, comprising:
    a memory storing a data structure; and
    control circuitry configured to:
        identify an erroneous term in a text segment of the on-screen caption text;
        extract a video frame from a video stream of the media asset corresponding to the text segment;
        identify a non-textual visual object in the video frame associated with the erroneous term, wherein the non-textual visual object comprises an image of a person;
        analyze the non-textual visual object in the video frame, using image recognition, to determine a contextual term associated with the erroneous term, wherein the contextual term comprises the identity of the person;

access a data structure to identify a candidate correction for the erroneous term based on the contextual term and a portion of the text segment; and replace the erroneous term in the text segment of the closed captioning text with the candidate correction.

11. The system of claim 10 wherein the control circuitry is further configured to:

determine the text segment of the on-screen caption text by analyzing an audio stream of the media asset.

12. The system of claim 10, wherein the control circuitry is further configured to identify the erroneous term in the text segment by performing natural language processing on the text segment to compare the text segment against a plurality of grammar rules.

13. The system of claim 10, wherein the text segment of the on-screen caption text is time-stamped, and wherein the video frame is extracted at a position of the media asset corresponding to a position of the erroneous term in the time-stamped text segment.

14. The system of claim 10, wherein the control circuitry is further configured to access the data structure to identify the candidate correction based on the contextual term and the portion of the text segment by:

extracting a keyword from the portion of the text segment;

searching in the data structure for nodes corresponding to the contextual term and the keyword;

analyzing the nodes for properties associated with the contextual term and the keyword; and determining at least one other node based on the properties associated with the contextual term and the keyword, wherein the at least one other node corresponds to the candidate correction.

15. The system of claim 10, wherein the control circuitry is further configured to access the data structure to identify the candidate correction for the erroneous term by:

determining a plurality of potential corrections for the erroneous term from the data structure;

assigning a weight to each potential correction of the plurality of potential corrections based on the determining; and identifying a potential correction associated with a highest weight as the candidate correction.

16. The method of claim 15, wherein the control circuitry is further configured to assign a higher weight to a more recent potential correction of the plurality of corrections.

17. The system of claim 15, wherein the control circuitry is further configured to:

determine a phonetic similarity score between a potential candidate correction and the erroneous term based on a phonetic algorithm; and assign a higher weight to the potential candidate correction with a higher phonetic similarity score.

18. The system of claim 10, wherein the control circuitry is further configured to access the data structure to identify the candidate correction based on the contextual term and the portion of the text segment by updating existing nodes of the data structure.

* * * * *